(12) United States Patent
Feigel

(10) Patent No.: US 9,834,188 B2
(45) Date of Patent: Dec. 5, 2017

(54) BRAKE SYSTEM FOR MOTOR VEHICLES

(71) Applicant: Continental Teves AG & Co. oHG, Frankfurt (DE)

(72) Inventor: Hans-Jörg Feigel, Rosbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/036,579

(22) PCT Filed: Nov. 13, 2014

(86) PCT No.: PCT/EP2014/074429
§ 371 (c)(1),
(2) Date: May 13, 2016

(87) PCT Pub. No.: WO2015/074936
PCT Pub. Date: May 28, 2015

(65) Prior Publication Data
US 2016/0264113 A1 Sep. 15, 2016

(30) Foreign Application Priority Data
Nov. 21, 2013 (DE) .................. 10 2013 223 859

(51) Int. Cl.
*B60T 8/42* (2006.01)
*B60T 8/32* (2006.01)
(Continued)

(52) U.S. Cl.
CPC .............. *B60T 8/326* (2013.01); *B60T 7/042* (2013.01); *B60T 8/4031* (2013.01);
(Continued)

(58) Field of Classification Search
CPC .......... B60T 7/042; B60T 8/326; B60T 8/405; B60T 8/3655; B60T 8/4059; B60T 8/4081; B60T 8/4086; B60T 13/58
(Continued)

(56) References Cited

U.S. PATENT DOCUMENTS 5,927,825 A * 7/1999 Schenk .................. B60T 8/4081
303/113.5
5,934,767 A 8/1999 Schmidt
(Continued)

FOREIGN PATENT DOCUMENTS

DE 19548207 6/1997
DE 10036287 2/2002
(Continued)

OTHER PUBLICATIONS

German Search Report for German Application No. 10 2013 223 859.2 dated Aug. 21, 2014, including partial translation.
(Continued)

*Primary Examiner* — Christopher Schwartz
(74) *Attorney, Agent, or Firm* — RatnerPrestia

(57) ABSTRACT

A hydraulic brake system includes a brake actuating element, a simulation device with a detector for detecting brake actuation by a driver. No mechanical and/or hydraulic operative connection between the brake actuating element and the wheel brakes is provided. A pressure medium reservoir, an electrically controllable pressure source for actuating the wheel brakes can be connected to each of the wheel brakes, electrically actuable wheel valves assigned to the wheel brakes for setting wheel brake pressures, and at least one electronic control and regulating unit for actuating the pressure source and wheel valves. The pressure source includes at least one piston which is sealed in a housing by a first sealing element and a second sealing element. In the
(Continued)

case of a leak of the first sealing element, a pressure build-up is carried out at the wheel brakes by the pressure source with use of the second sealing element.

14 Claims, 9 Drawing Sheets

(51) Int. Cl.
    *B60T 7/04*     (2006.01)
    *B60T 8/40*     (2006.01)

(52) U.S. Cl.
    CPC .......... *B60T 8/4081* (2013.01); *B60T 8/4086* (2013.01); *B60T 8/4018* (2013.01); *B60T 2270/82* (2013.01)

(58) Field of Classification Search
    USPC .......... 303/3, 7, 20, 113.5, 115.1, 115.2, 15, 303/114.1
    See application file for complete search history.

(56) References Cited

U.S. PATENT DOCUMENTS

| | | | | |
|---|---|---|---|---|
| 6,007,161 | A * | 12/1999 | Worsdorfer | B60T 7/042 303/115.2 |
| 6,315,370 | B1 * | 11/2001 | Feigel | B60T 7/042 303/113.4 |
| 6,386,842 | B1 | 5/2002 | Reuter | |
| 6,634,724 | B2 * | 10/2003 | Kobayashi | B60T 8/3265 188/1.11 E |
| 6,899,403 | B2 * | 5/2005 | Isono | B60T 8/4081 303/11 |
| 7,497,528 | B2 * | 3/2009 | Reuter | B60T 7/042 303/113.4 |
| 8,342,615 | B2 * | 1/2013 | Drumm | B60T 8/4077 188/152 |
| 8,684,147 | B2 | 4/2014 | Winkler | |
| 8,874,341 | B2 * | 10/2014 | Crombez | B60T 7/042 701/70 |
| 9,308,905 | B2 * | 4/2016 | Biller | B60T 8/4081 |
| 9,315,180 | B2 * | 4/2016 | Jungbecker | B60T 8/4081 |
| 2002/0050739 | A1 | 5/2002 | Koepff | |
| 2008/0196983 | A1 * | 8/2008 | Von Hayn | B60T 7/042 188/156 |
| 2010/0241330 | A1 * | 9/2010 | Hartmann | B60T 8/267 701/70 |
| 2012/0169112 | A1 * | 7/2012 | Jungbecker | B60T 8/4081 303/9.75 |

FOREIGN PATENT DOCUMENTS

| | | |
|---|---|---|
| DE | 10304145 | 8/2004 |
| DE | 102004016141 | 10/2005 |
| DE | 102008051350 | 4/2009 |
| EP | 0734929 | 10/1996 |
| WO | 9713672 | 4/1997 |
| WO | 0068056 | 11/2000 |

OTHER PUBLICATIONS

International Search Report and Written Opinion of the International Searching Authority for International Application No. PCT/EP2014/074429 dated Jan. 20, 2015.

* cited by examiner

BRAKE SYSTEM FOR MOTOR VEHICLES

CROSS REFERENCE TO RELATED APPLICATIONS

This application is the U.S. National Phase Application of PCT International Application No. PCT/EP2014/074429, filed Nov. 13, 2014, which claims priority to German Patent Application No. 10 2013 223 859.2, filed Nov. 21, 2013, the contents of such applications being incorporated by reference herein.

FIELD OF THE INVENTION

The invention concerns a brake system for motor vehicles.

BACKGROUND OF THE INVENTION

Hydraulic vehicle brake systems are known that are in the form of power-assisted brake systems, and besides a muscle-powered master brake cylinder to which the wheel brakes are hydraulically connected and that provides the pressure and volume for actuating wheel brakes, comprise a further electrically controlled pressure and volume providing device, which actuates the wheel brakes in a "brake-by-wire" mode. In the event of a failure of the electrically controlled pressure and volume providing device, a hydraulic fallback level carries out actuation of the wheel brakes using only the muscle power of the driver of the vehicle.

An electrohydraulic brake system is known from DE 195 48 207 A1, which is incorporated by reference in which the driver of the vehicle has no possibility of a direct mechanical-hydraulic actuation of the wheel brakes. A demand for braking by the driver of the vehicle is passed on exclusively electrically ("by-wire"). The brake system comprises a brake pedal, a wheel brake pressure target value generator coupled to the brake pedal, a control unit, an electrically controlled pressure source comprising a pump driven by an electric motor and a hydraulic reservoir that can be charged by the pump, a pressure medium reservoir container and a first and a second valve per hydraulically actuated wheel brake for setting wheel brake pressures. The pressure source is implemented with one circuit, i.e. all wheel brakes are connected to the same pressure source or to the same pressure output of the pressure source. The wheel brakes are exclusively subjected to pressure by the pressure source during the operation of the brake system. In the case of a single leak in the pressure source, a pressure build-up can no longer be carried out in the pressure source and braking is no longer possible.

An electrohydraulic brake system with a pressure source for the front wheel brakes and a further pressure source for the rear wheel brakes is known from DE 100 36 287 A1, which is incorporated by reference wherein each pressure source comprises a hydraulic pump and a high pressure reservoir. Such a brake system is expensive owing to the two pressure sources and requires more installation space than a brake system with only a single pressure source.

SUMMARY OF THE INVENTION

An aspect of the present invention provides a compact hydraulic "by-wire" brake system for motor vehicles without a hydraulic or mechanical fallback level through the muscle power of the driver of the vehicle, wherein the system comprises improved availability.

An aspect of the invention is based on the concept of using an electrically controlled, single circuit pressure source to actuate the hydraulically actuated wheel brakes of the motor vehicle, which pressure source comprises at least a first piston that is sealed in a housing by means of a first sealing element, that is displaceably guided and that can be actuated by an electric motor, wherein the pressure source comprises a second sealing element and is implemented such that in the event of a leak of the first sealing element a pressure build-up at the wheel brakes is performed by means of the pressure source using the second sealing element.

Single circuit pressure source means that the pressure source is or can be connected to each of the wheel brakes.

The brake system preferably comprises only said one pressure source, so that the wheel brakes can be subjected to pressure exclusively by means of the pressure source during operation of the brake system.

Advantageously, no pressure source for actuation of the wheel brakes that can be actuated by a brake actuating element, for example in the form of a master brake cylinder actuated by the brake pedal, is provided in the brake system.

An aspect of the invention gives the advantage that a compact structure is achieved, because only one pressure source is provided for the actuation of all hydraulically actuated wheel brakes of the motor vehicle. Nevertheless, a leak, for example in a sealing element of the pressure source, still does not result in complete failure of the hydraulic brake system.

The second sealing element preferably has no sealing effect if the first piston is in a non-actuated state. Particularly preferably, in a non-actuated state of the first piston, the first piston is not in contact with the second sealing element, i.e. it is not simply a double seal. More particularly preferably, the two sealing elements are disposed one after the other and spaced apart.

According to a preferable embodiment of the brake system, the pressure source comprises a pressure chamber bounded by the first piston and the housing, which pressure chamber is or can be connected to each of the wheel brakes, wherein the pressure chamber can be sealed by the first and/or the second sealing element. In the case in which the sealing element does not seal, the pressure build-up in the pressure chamber and hence at the wheel brakes can be carried out by means of the second sealing element.

The pressure chamber is preferably sealed by the first sealing element with the first piston in a non-actuated state, and the second sealing element provides an effective seal following a predetermined actuation of the first piston. Particularly preferably, the first piston comes into contact with the second sealing element following a predetermined actuation of the first piston, so that the pressure chamber is sealed by the second sealing element. In the case of a leak of the first sealing element, the first piston is accordingly moved forward so that the second sealing element provides an effective seal and the wheel brakes can continue to be subjected to pressure by means of the pressure chamber.

It is also preferable that the pressure source comprises a stepped bore disposed in the housing and the first piston implemented as a stepped piston, the smaller diameter piston stage of which, following a predetermined actuation of the stepped piston, divides the pressure chamber into a first pressure chamber sealed by the second sealing element and a second pressure chamber. Particularly preferably, the smaller diameter piston stage, following a predetermined actuation of the stepped piston, penetrates into the smaller diameter stage of the stepped bore and the second sealing element, so that the pressure chamber is divided into the first pressure chamber sealed by the second sealing element and the second pressure chamber. In the event of a leak of the first sealing element, the stepped piston is moved forwards accordingly so that the wheel brakes, which are connected to the first pressure chamber or in the region of the first pressure chamber, can continue to be subjected to pressure.

According to another preferable embodiment of the brake system, the pressure source comprises a first cylinder-piston arrangement with the first piston and the first sealing element and a second cylinder-piston arrangement with a second piston and the second sealing element, wherein the first and the second pistons are actuated by the electric motor, and wherein the pressure ports of the cylinder-piston arrangements are or can be connected to each other and to each of the wheel brakes. In the case in which the sealing element of the one cylinder-piston arrangement does not seal, the pressure build-up at the wheel brakes can thus be carried out by means of the cylinder-piston arrangement with the second sealing element.

In order to be able to perform an optimized arrangement of the brake system in the vehicle, the pressure source and the wheel valves are preferably disposed in a pressure modulation device that is separated from the simulation device. Particularly preferably, the control and regulation unit is disposed in the pressure modulation device. The simulation device and the pressure modulation device are advantageously disposed spatially separately from each other in the vehicle in order to achieve increased protection of the feet of the driver of the vehicle in the event of an accident.

According to a development of the invention, the brake system comprises an electrically actuated parking brake system that comprises an electromechanically actuated brake actuator on each of at least two wheel brakes, wherein the parking brake system can be actuated by the control and regulation unit.

Advantageously, the control and regulation unit comprises means such that braking is performed by the parking brake system in the event of a mechanical fault of the pressure source whereby a pressure build-up by the pressure source is no longer possible. This allows emergency braking in the unlikely event of a mechanical fault of the pressure source.

According to a preferred development of the brake system, the control and regulation unit and the electric motor are implemented such that in the event of a single electrical fault in the pressure source, a pressure build-up by the pressure source continues to be possible. As a result, braking remains possible in the event of a single electrical fault in the actuation electronics of the pressure source or one of the windings of the electric motor. Particularly preferably, the means of the control and regulation unit for actuation of the electric motor are implemented in a redundant manner and windings of the electric motor are implemented and actuated separately.

In order to prevent unintentional actuation of the wheel brakes in the event of a failure of the brake system, with the brake system in a deenergized state, each of the wheel brakes is preferably connected to the pressure medium reservoir container for the purpose of pressure equalization.

BRIEF DESCRIPTION OF THE DRAWINGS

Further preferable embodiments of the invention are revealed in the dependent claims and the following description using figures.

In the figures

DETAILED DESCRIPTION OF THE PREFERRED EMBODIMENTS

Figure 1:
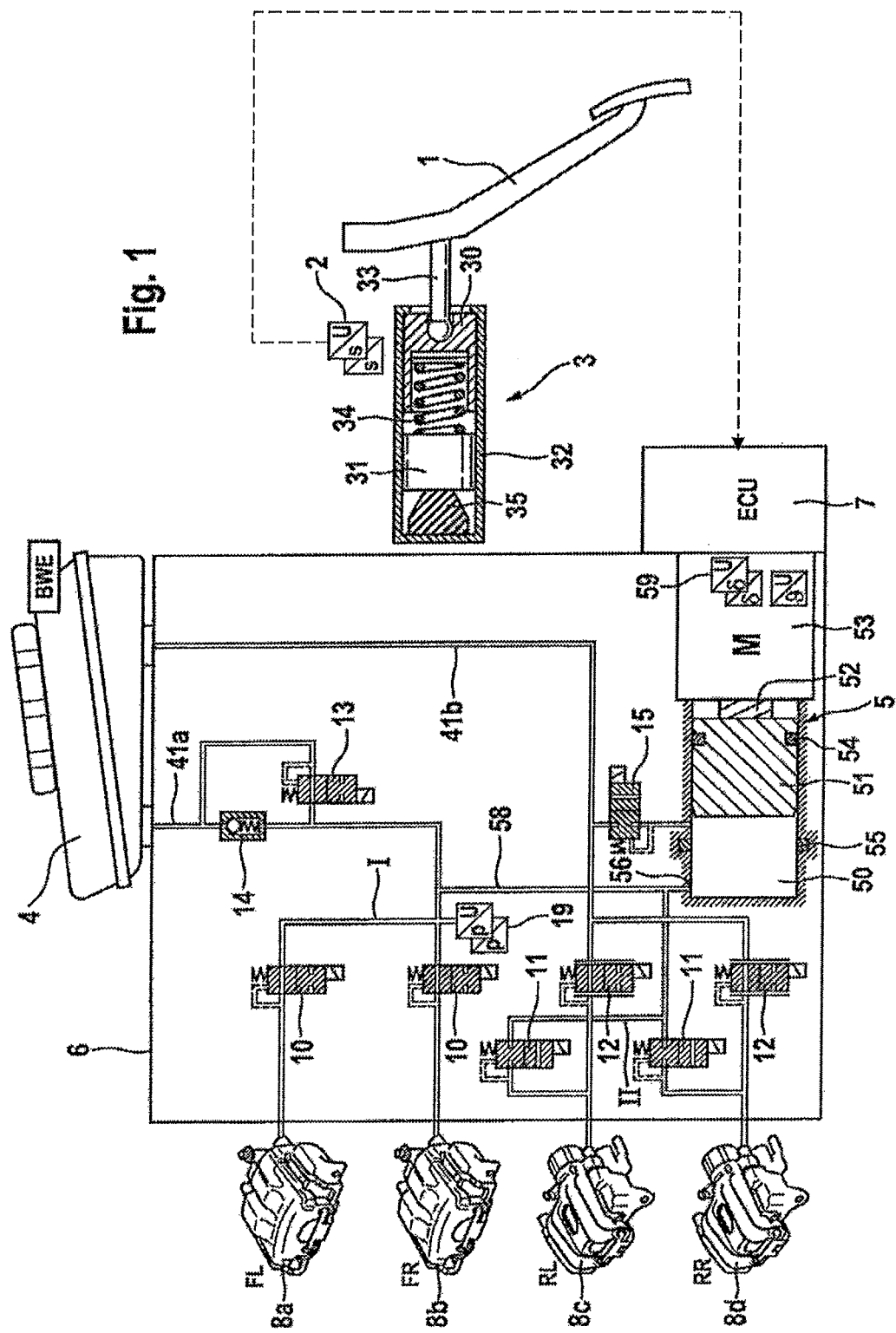
FIG. 1 shows schematically a first exemplary embodiment of a brake system according to an aspect of the invention.

In FIG. 1 a first exemplary brake system is illustrated schematically. The brake system essentially comprises a brake actuating element 1, for example a brake pedal, a simulation device 3 coupled to the brake actuating element 1 with a measurement device 2 that is preferably implemented in a redundant form for detecting a brake actuation by the driver of the vehicle, for example a travel sensor for detecting an actuation travel, an electronic control and regulation unit 7, a pressure medium reservoir container 4 under atmospheric pressure and an electrically controlled pressure modulation device 6 (hydraulic unit, HCU), to which hydraulically actuated wheel brakes 8a-8d of a motor vehicle that is not shown can be connected. The pressure modulation device 6 essentially comprises an electrically controlled pressure source 5, a plurality of electrically actuated valves 10, 11, 12, 13 and at least one pressure sensor 19 that is preferably implemented in a redundant form for detecting a pressure of the pressure source 5.

The brake system comprises no master brake cylinder actuated by means of the brake actuating element 1 that is or can be connected to the wheel brakes 8a-8d. It is a "brake-by-wire" brake system, in which it is not possible for the driver of the vehicle to perform direct mechanical-hydraulic actuation of the wheel brakes. There is no mechanical or hydraulic fallback level of a direct feedthrough from the driver of the vehicle to the wheel brakes. A braking demand by the driver of the vehicle is exclusively forwarded or executed electrically ("by-wire").

According to the exemplary embodiment, the wheel brakes 8a and 8b are assigned to the left (FL) and right (FR) front wheels and are connected to the first brake circuit supply line I. The wheel brakes 8c and 8d are assigned to the left (RL) and right (RR) rear wheels and are or can be connected to the second brake circuit supply line II (so-called black/white division).

Advantageously, the simulation device 3 provides the driver of the vehicle with the accustomed feel of a brake pedal in the event of actuation of the brake pedal 1. According to the example, the simulation device 3 comprises two pistons 30, 31 disposed one after the other, which are displaceably disposed in a housing 32. A piston rod 33 couples the pivoting motion of the brake pedal 1 resulting from pedal actuation to the translation motion of the first piston 30, the actuation travel of which is detected by the travel sensor 2. The piston 30 is supported on the piston 31 by means of a spring 34. The piston 31 is supported on the housing 32 by an elastic element 35.

The electrically controlled pressure source 5 is in the form of a displacement pump and comprises a hydraulic cylinder-piston arrangement, the piston 51 of which can be actuated by an electromechanical actuator, which according to the example is formed by a schematically indicated electric motor 53 and a likewise schematically illustrated rotation-translation transmission 52. The rotation-translation transmission 52 is for example formed by a ball screw mechanism (KGT), the spindle of which is illustrated in FIG. 1. According to the example, the pressure source 5 is formed by a bore disposed in the housing of the pressure modulation device 6, in which the piston 51 is displaceably guided. The piston 51 bounds a pressure chamber 50 with the housing. The pressure source 5 is implemented in a single circuit form, i.e. the pressure source 5 or the pressure chamber 50 thereof is or can be connected to all hydraulically actuated wheel brakes 8a-8d of the motor vehicle. By a displacement of the piston 51 in the actuation direction (towards the left in FIG. 1), pressure medium can be displaced out of the pressure chamber 50 to the wheel brakes 8a-8d. The port 56 of the pressure source 5 for the wheel brakes 8a-8d is connected to a system pressure line segment 58, which is connected on the one hand to the brake circuit supply lines I, II and on the other hand to a pressure equalization line 41a to the pressure medium reservoir container 4. The pressure equalization line 41a contains a parallel circuit of a normally open (NO) diagnostic valve 13 with a non-return valve 14 that closes towards the pressure medium reservoir container 4. By means of the line 41a, pressure medium can be sucked back into the pressure chamber 50 by retracting the piston 51. According to the example, the pressure sensor 19 for detecting the pressure of the pressure source 5 is disposed in the region of the system pressure line segment 58.

Regardless of the actuation state of the piston 51, the pressure chamber 50 is sealed against atmospheric pressure by means of a first sealing element 54, which according to the example is disposed on the piston 51, i.e. for example even with the piston 51 in the non-actuated state (as illustrated in FIG. 1). A second sealing element 55 that comes into contact with the piston 51 with sufficient actuation of the piston 51 is disposed in the housing, so that the pressure chamber 50 is sealed by the second sealing element 55 with the piston 51 in the inserted state. The port 56 for the wheel brakes 8a-8d is disposed in a region of the pressure chamber 50 that can also be sealed by the second sealing element 55.

One advantage of the two-stage pressure source 5, so to speak, is that in the event of a leak in the region of the first sealing element 54, the piston 51 can simply be moved forwards into engagement with the second sealing element 55 and then a pressure build-up at the wheel brakes 8a-8d continues to be possible. The availability of an electrically controlled build-up of pressure at the wheel brakes 8a-8d by means of the pressure source 5 is thus increased.

For detecting a variable characteristic of the position/location of the piston 51 of the pressure source 5, a sensor 59 is provided that according to the example is implemented as a rotor position sensor that is used for detecting the rotor position of the electric motor 53. Other sensors are also conceivable, for example a travel sensor for detecting the position/location of the piston 51. Using the characteristic variable for the position/location of the piston 51, determination of the volume of pressure medium output by or received by the pressure source 5 is possible.

According to the example, the pressure modulation device 6 comprises an electrically actuated, normally open wheel valve 10 for each wheel brake 8a, 8b of the first brake circuit I that is disposed between the wheel brake 8a, 8b and the brake circuit supply line I (i.e. between the pressure source 5 and the wheel brake 8a, 8b). For each wheel brake 8c, 8d of the second brake circuit II, an electrically actuated, normally closed inlet valve 11 is provided that is disposed between the pressure source 5 and the wheel brake 8c, 8d, and an electrically actuated, normally open, analogized or analog actuated outlet valve 12 is provided between the wheel brake 8c, 8d and the pressure equalization line 41b. With the brake system in the deenergized state, the wheel brakes 8a, 8b are connected to the pressure medium reservoir container 4 by means of the open valves 10, 13 and the wheel brakes 8c, 8d are connected to the pressure medium reservoir container 4 by means of the open valves 12.

Optionally, the pressure chamber 50 is connected to a pressure equalization line 41b to the pressure medium reservoir container 4 by means of an electrically actuated, advantageously normally closed seal checking valve 15. The optional connection to the seal checking valve 15 between the pressure chamber 50 and the pressure equalization line 41b is shown in a dashed form in FIG. 1. A dormant fault of the second sealing element 55 can be detected by test routines. Thus, for example, at defined time intervals, preferably in the starting phase or in other operating states of the vehicle, the seal checking valve 15 is opened, the piston 51 is displaced forwards until it is inserted into the second sealing element 55, the valves 10, 11 are kept closed to the wheel brakes and the pressure arising is assessed by means of the pressure sensors 19 as an indication of an intact sealing effect of the second sealing element 55.

The electronic control and regulation unit (ECU) 7 is used for example for actuation of the pressure source 5 and the valves 10, 11, 12, 13, 15 of the pressure modulation device 6 as well as for the analysis of the signals of the sensors 19, 59 of the pressure modulation device 6. A target vehicle deceleration value, for example a target system pressure for the pressure source, is determined in the control and regulation unit 7 or in a further control and regulation unit using the detected driver's braking demand (sensor 2) and/or the signals of one or a plurality of environmental sensors (for example an image acquisition system) and/or the signals from one or a plurality of sensors for detecting the vehicle's independent movements/dynamics (for example a wheel revolution rate sensor or an acceleration sensor or a yaw rate sensor).

The brake system gives the advantage that in the event of a leak in a wheel brake circuit, a maximum of only one brake circuit (I or II) fails, both during operation and also when the vehicle is at a standstill. In the event of a wheel brake circuit leak during operation, a pressure build-up in the remaining wheel circuits remains possible by suitable valve switching.

Advantageously, the exemplary brake systems also comprise, in addition to the described hydraulic service brake system, an electrically actuated parking brake system (not shown). The parking brake system comprises electromechanically actuated brake actuators at the wheel brakes of at least one of the two axles.

For example, a combined wheel brake is known from DE 10 2008 051 350 A1, which is incorporated by reference that comprises a hydraulically actuated service brake and an electromechanically actuated parking brake, also known as an emergency brake, wherein a hydraulic working pressure chamber in a brake housing is bounded by a brake piston, which on the one hand can be subjected to a hydraulic pressure medium for performing service braking and on the other hand to achieve parking braking can be actuated along a piston longitudinal axis by means of a self-locking transmission, which converts the rotational motion of an electric motor into a translational motion of the brake piston for performing the parking braking process and holds the brake piston in the actuated position by the self-locking of the transmission.

In the event of a mechanical fault of the pressure source 5 of the brake system (for example a breakage or jamming in the electromechanical actuator 52, 53), with which a pressure build-up in the pressure source 5 is no longer possible, the parking brake system or the electromechanically actuated parking brake is actuated by means of the electronic control and regulation unit 7 in order to actuate the corresponding wheel brakes.

Figure 2:
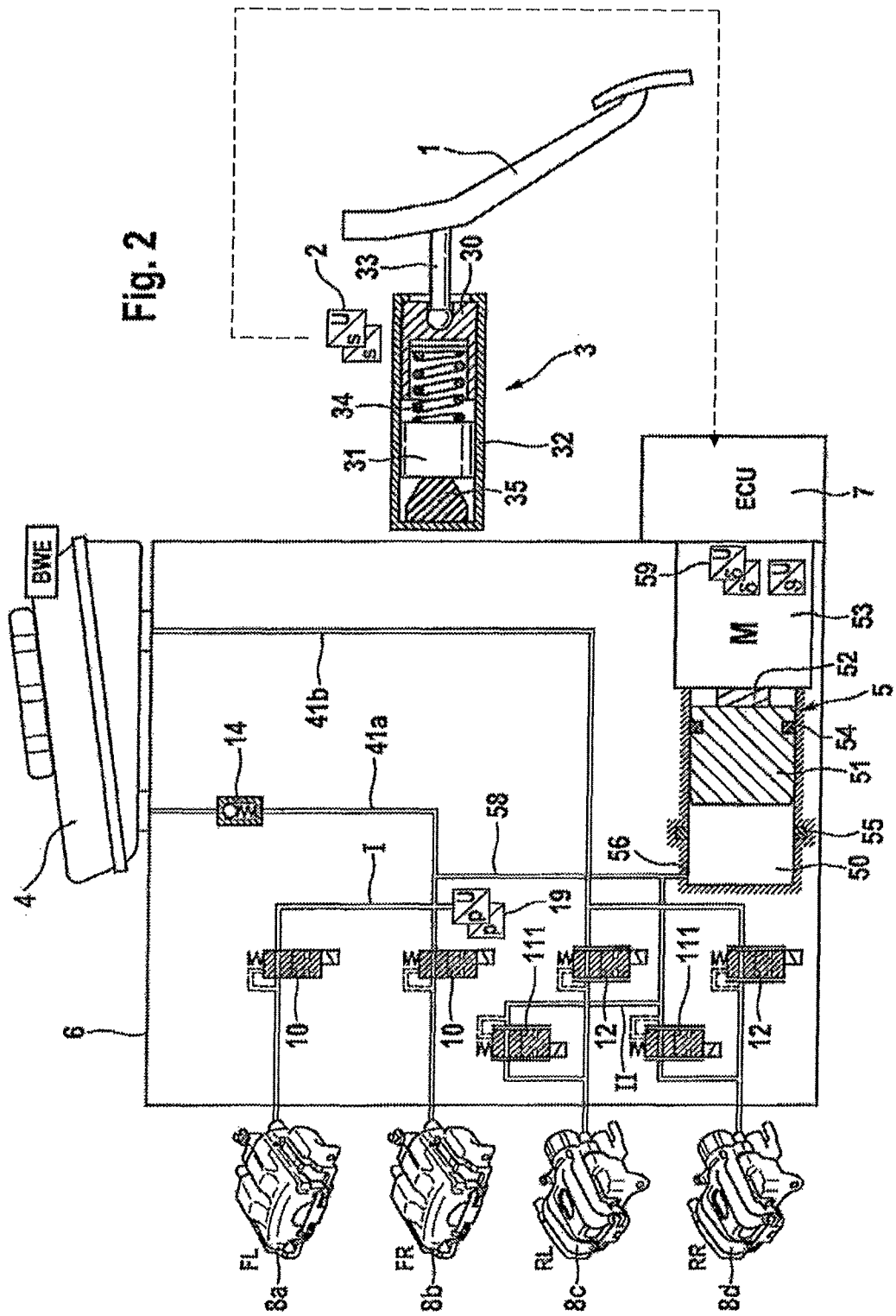
FIG. 2 shows schematically a second exemplary embodiment of a brake system according to an aspect of the invention.

FIG. 2 shows schematically a second exemplary embodiment of a brake system according to the invention. The brake system corresponds to the first exemplary embodiment in respect of the brake actuation and brake actuation detection 1, 2, 3, the electronic control and regulation unit 7, the pressure medium reservoir container 4 and the pressure source 5. In contrast to the first exemplary embodiment of FIG. 1, the pressure modulation device 6 of the second exemplary embodiment does not comprise the optional valve 15. Furthermore, there is no electrically actuated valve connected in parallel with the non-return valve 14 in line 41*a*, and the electrically actuated inlet valves 111 disposed between the pressure source 5 and the wheel brakes 8*c*, 8*d* of the second brake circuit II are implemented as normally open and analogized (or actuated in an analog manner). With the brake system in the deenergized state, the wheel brakes 8*a*, 8*b* are connected to the pressure medium reservoir container 4 by means of the open valves 10, 111, 12 and the wheel brakes 8*c*, 8*d* are connected to the pressure medium reservoir container 4 by means of the open valves 12.

Figure 3:
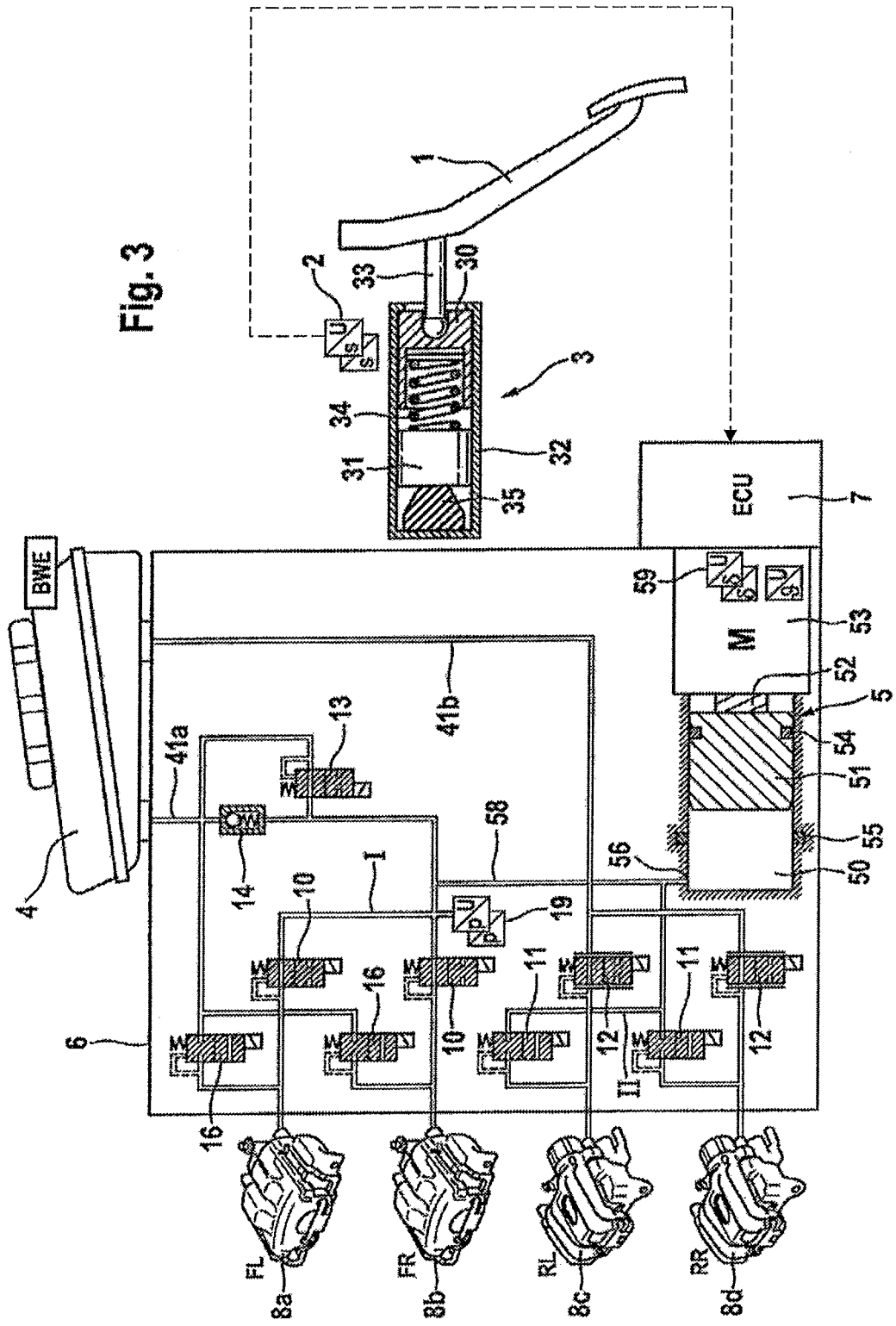
FIG. 3 shows schematically a third exemplary embodiment of a brake system according to an aspect of the invention.

FIG. 3 shows schematically a third exemplary embodiment of a brake system according to the invention, which essentially corresponds to the first exemplary embodiment, wherein the pressure modulation device 6 additionally comprises an electrically actuated, normally closed outlet valve 16 for each wheel brake 8*a*, 8*b*. The wheel brakes 8*a*, 8*b* can be connected to the pressure equalization line 41*a* to the pressure medium reservoir container 4 by means of the outlet valve 16. The lines from the output ports of the output valves 16 open into the line 41*a* between non-return valve 14 and the pressure medium container 4.

According to a further exemplary embodiment that is not shown, the brake system corresponds to the second exemplary embodiment, wherein here too additional electrically actuated, normally closed output valves 16 are provided for the wheel brakes 8*a*, 8*b*.

Figure 4:
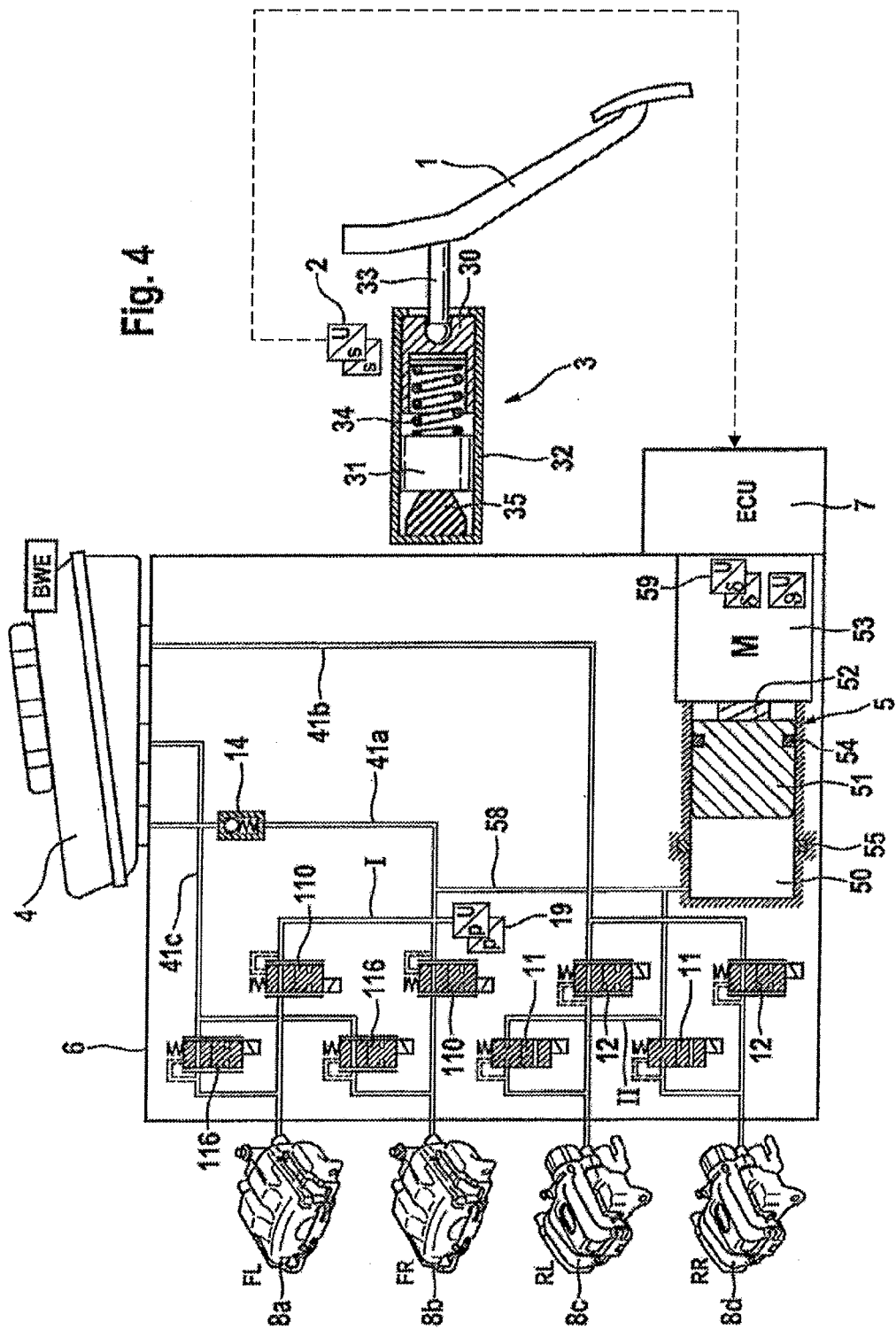
FIG. 4 shows schematically a fourth exemplary embodiment of a brake system according to an aspect of the invention.

FIG. 4 shows schematically a fourth exemplary embodiment of a brake system according to the invention. The brake system corresponds to the third exemplary embodiment in respect of the brake actuation and brake actuation detection 1, 2, 3, the electronic control and regulation unit 7, the pressure source 5 and the valves 11, 12 for the wheel brakes 8*c*, 8*d*. There is no electrically actuated valve connected in parallel with the non-return valve 14 in line 41*a*. The brakes of the front axle 8*a*, 8*b* are controlled in a fully analog manner. For this purpose, an electrically actuated, normally open inlet valve 110 that is analogized or analog actuated is provided for each wheel brake 8*a*, 8*b* between the wheel brake 8*a*, 8*b* and the brake circuit supply line I as well as a normally open outlet valve 116 that is analogized or analog actuated. The output valves 116 are connected by means of a third pressure equalization line 41*c* to the pressure medium reservoir container 4, for example a third chamber of the pressure medium reservoir container.

Figure 5:
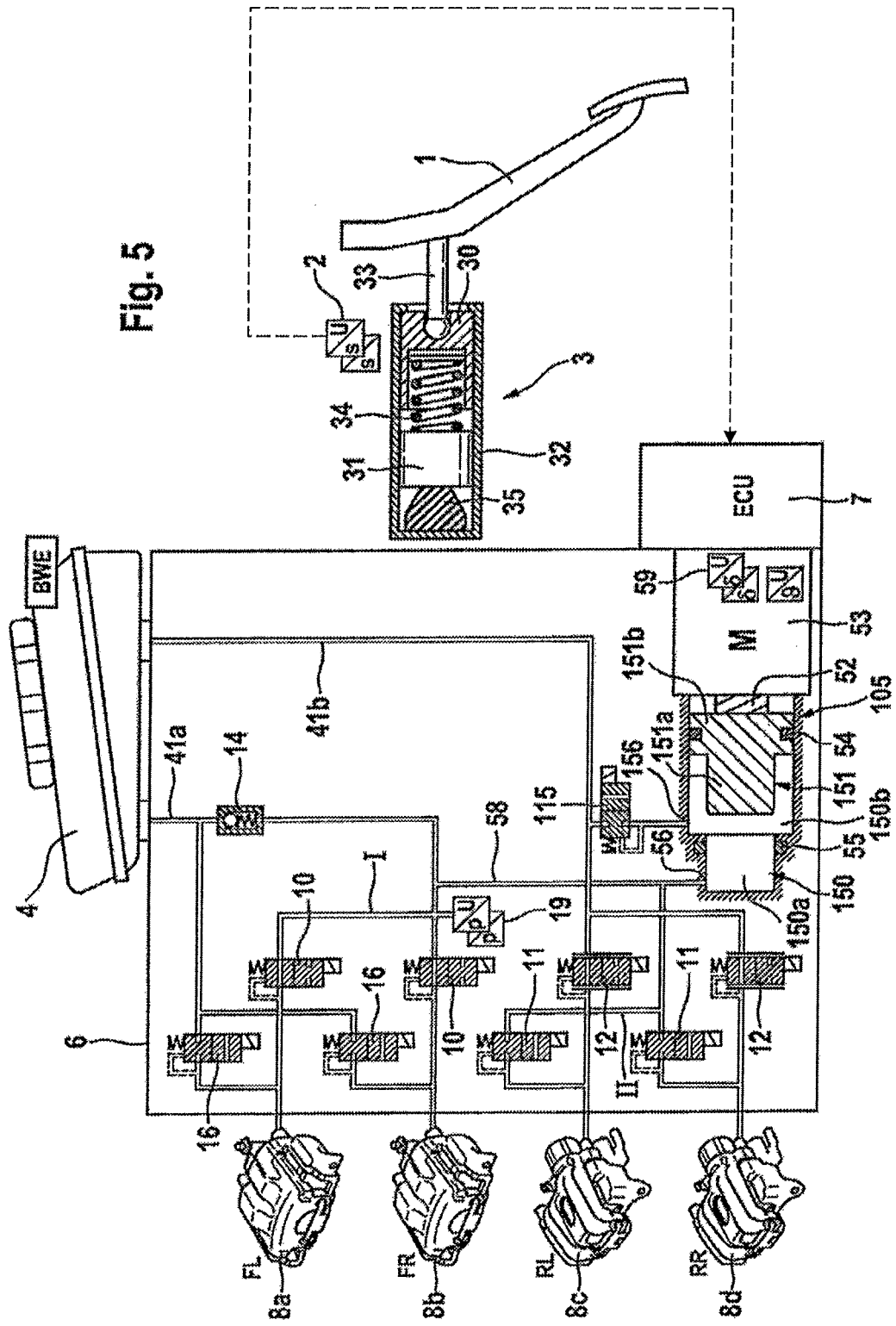
FIG. 5 shows schematically a fifth exemplary embodiment of a brake system according to an aspect of the invention

The pressure source 105 of the fifth exemplary embodiment of a brake system according to the invention shown in FIG. 5 differs from the pressure source 5 of the first to fourth exemplary embodiments. The pressure source 105 is also in the form of a single circuit displacement pump with a hydraulic cylinder-piston arrangement. However, a stepped bore comprising a first bore region with a first bore diameter and a second bore region with a second bore diameter is disposed in the housing of the pressure modulation device 6, wherein the first bore diameter is smaller than the second bore diameter. The piston 151 is displaceably accommodated in the stepped bore. The piston 151 together with the (stepped) housing bore bounds the pressure chamber 150. The piston 151 is actuated by the electromechanical actuator, according to the example with an electric motor 53 and a rotation-translation transmission 52. The wheel brakes 8*a*-8*d* are connected by means of the hydraulic connection 58 to a first port 56 of the pressure chamber 150. The pressure chamber 150 is sealed against atmospheric pressure by means of a first sealing element (main seal) 54. The piston 151 is in the form of a stepped piston, i.e. it comprises a first piston region 151*a* with a first piston diameter and a second piston region 151*b* with a second piston diameter, wherein the first piston diameter is smaller than the second piston diameter. In other words, the piston 151 comprises a journal 151*a* with a smaller diameter.

The stepped bore and the piston 151 are implemented such that in the event of actuation of the stepped piston 151 in the actuation direction, the piston stage 151*a* of smaller diameter (the journal) passes into the smaller diameter stage of the stepped bore following a predetermined actuation or following a predetermined actuation travel. As a result, the pressure chamber 150 is divided into a first pressure chamber 150*a* and a second pressure chamber 150*b*, wherein the second pressure chamber 150*b* is an annular chamber. For sealing the two pressure chambers 150*a*, 150*b* with respect to each other, a second sealing element 55 is provided that is located between the smaller diameter piston stage 151*a* and the housing in the region of the bore stage of smaller diameter with the piston stage 151*a* in the inserted state. In doing so, the sealing element 55 can be disposed in the housing in the region of the bore stage of smaller diameter, as is illustrated according to the example in FIG. 5. The journal 151*a* then passes into the sealing element 55. Alternatively, the sealing element 55 can be attached to the stepped piston in the region of the smaller diameter piston stage 151*a*, advantageously to the end of the piston stage of smaller diameter that is remote from the piston stage of larger diameter (arrangement of the second sealing element 55 on the journal). The piston stage 151*a* with the sealing element 55 then passes into the smaller bore. The first port 56 of the pressure chamber 150 for connecting the wheel brakes 8*a*-8*d* is disposed in the region of the first pressure chamber 150*a*. By this means and owing to the two-stage implementation of the pressure supply device 105, the availability of an electrically controlled build-up of pressure at the wheel brakes by means of the pressure source can be increased. A two-stage implementation of the pressure source means the stepped implementation of the housing bore and of the piston 151 with two sealing elements 54, 55, by which the pressure chamber 150 is divided into two pressure chambers 150a, 150b that can be sealed off from each other. In the event of a failure of the main seal 54, if a pressure build-up in the pressure chamber 150 is no longer possible, the piston 151 can be displaced until the second sealing element 55 is engaged. The pressure chamber 150a is then sealed against atmospheric pressure by the sealing element 55, so that a pressure build-up continues to be possible in the pressure chamber 150a and hence in the wheel brakes. Dormant faults of the sealing element 55 can be detected by test routines. Thus for example, at defined time intervals, preferably in the starting phase, or in other operating states in which the vehicle is at a standstill, the hydraulic valve is opened, the piston is displaced until penetration into the second sealing element has occurred, the connecting valves 10, 11 are held closed to the wheel brakes and the corresponding pressure is evaluated by means of the pressure sensors 19 as an indication of an intact sealing effect of the second sealing element.

According to the example, a second port 156 for the pressure chamber 150 is provided in the region of the second pressure chamber 150b. By means of the port 156, the pressure chamber 150b is connected by means of an electrically actuated, normally open hydraulic valve 115 to the pressure medium reservoir container 4, for example line 41b.

The pressure modulation device 6 corresponds to the third exemplary embodiment in respect of the wheel valves 10, 11, 12, 16, there being no electrically actuated valve connected in parallel with the non-return valve 14 in line 41a.

According to a further exemplary embodiment that is not shown, the brake system corresponds the fifth exemplary embodiment, wherein instead of the normally open valve 115 a normally closed valve is provided and the normally closed valves 11 of the wheel brakes 8c, 8d are replaced by normally open and analogized (or analog actuated) valves 111.

Figure 6:
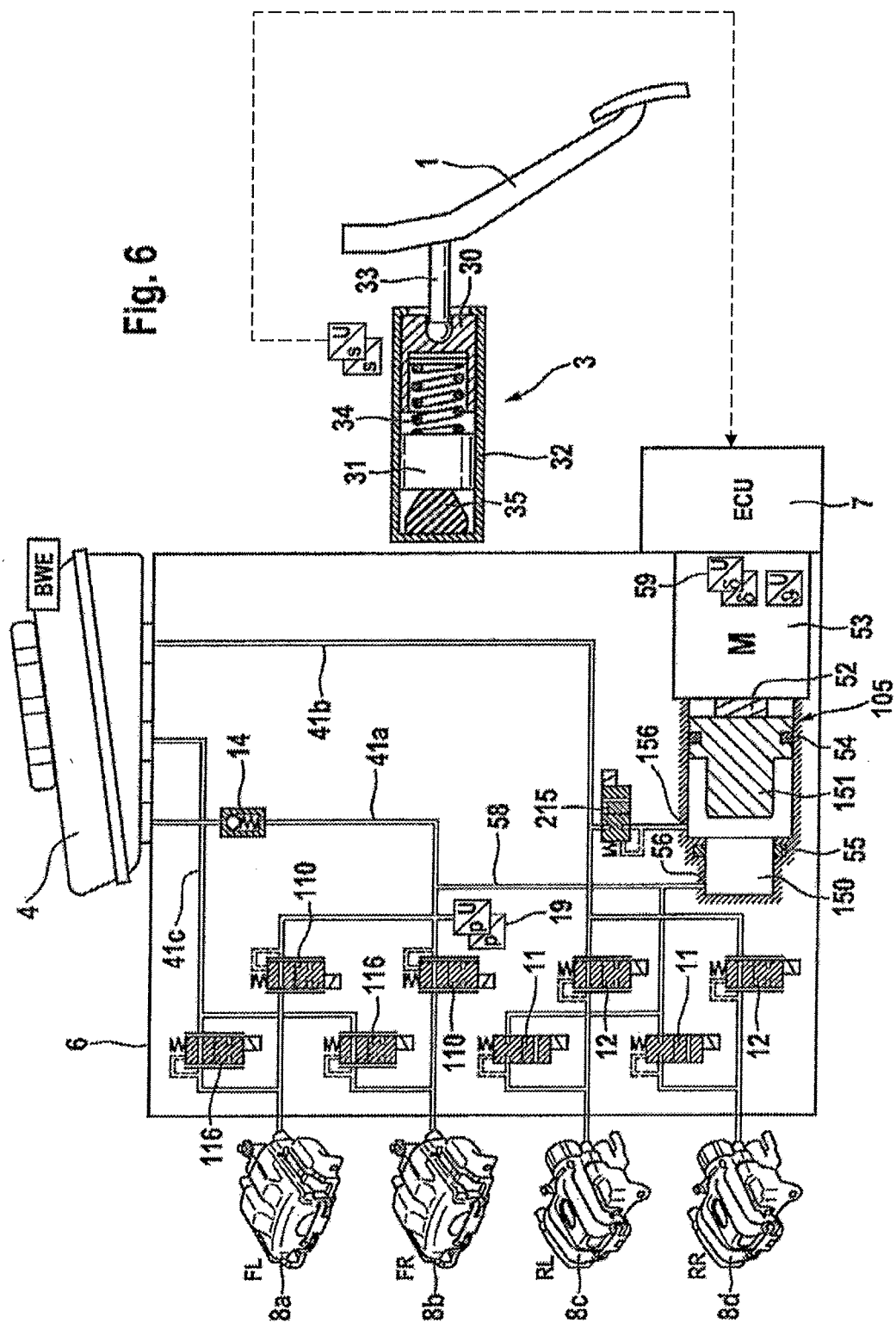
FIG. 6 shows schematically a sixth exemplary embodiment of a brake system according to an aspect of the invention

Also with the sixth exemplary embodiment shown in FIG. 6, a normally closed valve 215 is provided instead of the normally open valve 115 of FIG. 5. For the front wheel brakes 8a, 8b the pressure modulation device 6 comprises normally open, analogized or analog actuated wheel valves 110 and 116 corresponding to the fourth exemplary embodiment, wherein the output valves 116 are connected to the pressure medium reservoir container 4 by means of the third pressure equalization line 41c.

Figure 7:
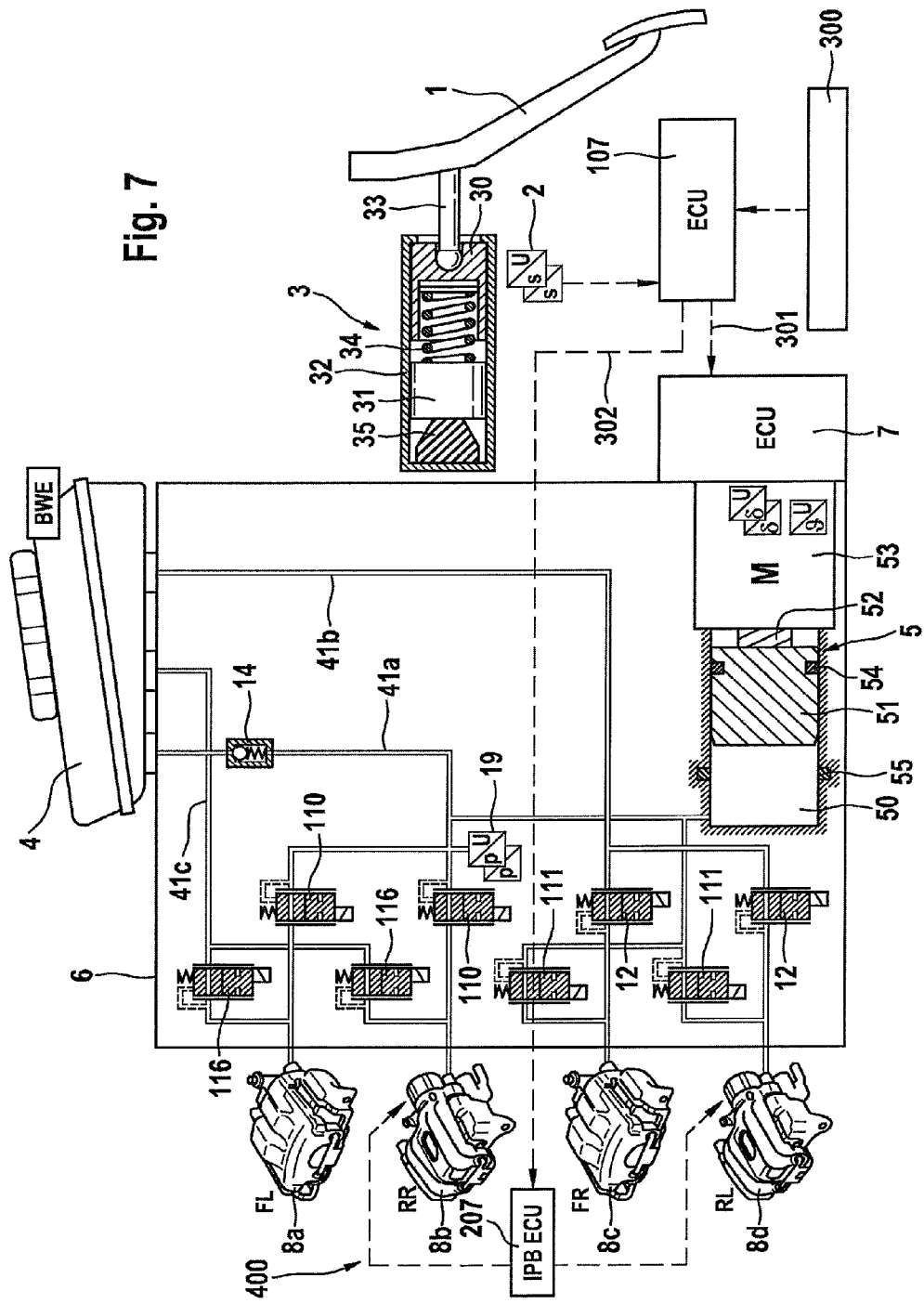
FIG. 7 shows schematically a seventh exemplary embodiment of a brake system according an aspect of to the invention.

In FIG. 7 a seventh exemplary brake system is illustrated schematically. The brake system essentially comprises a brake actuating element 1, a simulation device 3 coupled to the brake actuating element 1 with a measurement device 2, an electronic control and regulation unit 7, a pressure medium reservoir container 4 under atmospheric pressure and a pressure source 5 with a pressure sensor 19 as accurately described using the first exemplary embodiment. According to the example, the brake system comprises a diagonal division of the wheel brakes, i.e. the wheel brake 8a is associated with the left front wheel (FL) and the wheel brake 8b with the right rear wheel (RR) (brake circuit I), whereas the wheel brake 8c is associated with the right front wheel (FR) and the wheel brake 8d with the left rear wheel (RL) (brake circuit II). All wheel brakes 8a-8d are fully analog controlled. Accordingly, for each wheel brake 8a, 8b an electrically actuated, normally open, analogized or analog actuated inlet valve 110 is provided between the wheel brake 8a, 8b and the brake circuit supply line I and a normally open, analogized or analog actuated outlet valve 116 is provided. The outlet valves 116 are connected by means of a third pressure equalization line 41c to the pressure medium reservoir container 4. Besides the electrically actuated, normally open, analogized or analog actuated outlet valve 12, a likewise normally open, analogized or analog actuated inlet valve 111 is provided for each wheel brake 8c, 8d.

The exemplary brake system comprises the hydraulic service brake system and an electrically actuated parking brake system. For this purpose, the wheel brakes 8b and 8d of the rear axle each comprise an electromechanically actuated brake actuator (IPB).

According to the example, the brake system comprises two further control and regulating units 107 and 207. A target vehicle deceleration value is determined in the control and regulating unit 107 using the driver brake demand detected by means of the sensor 2 and the signals of an environmental sensor arrangement 300. At least said information is fed to the control and regulating unit 7 by means of a data line 301 for actuating the pressure modulation device 6 and by means of a data line 302 to the control and regulating unit 207 for actuating the parking brake system or the electromechanically actuated brake actuators of the wheel brakes 8b, 8d. For example, in the event of a mechanical fault of the pressure source 5, whereby a build-up of pressure in the pressure source is no longer possible, the parking brakes of the wheel brakes of the rear axle are actuated by means of the control and regulating unit 207.

The seventh exemplary brake system with fully analog controlled wheel brake pressures can of course also be used with a black and white division of the wheel brakes.

Figure 8:
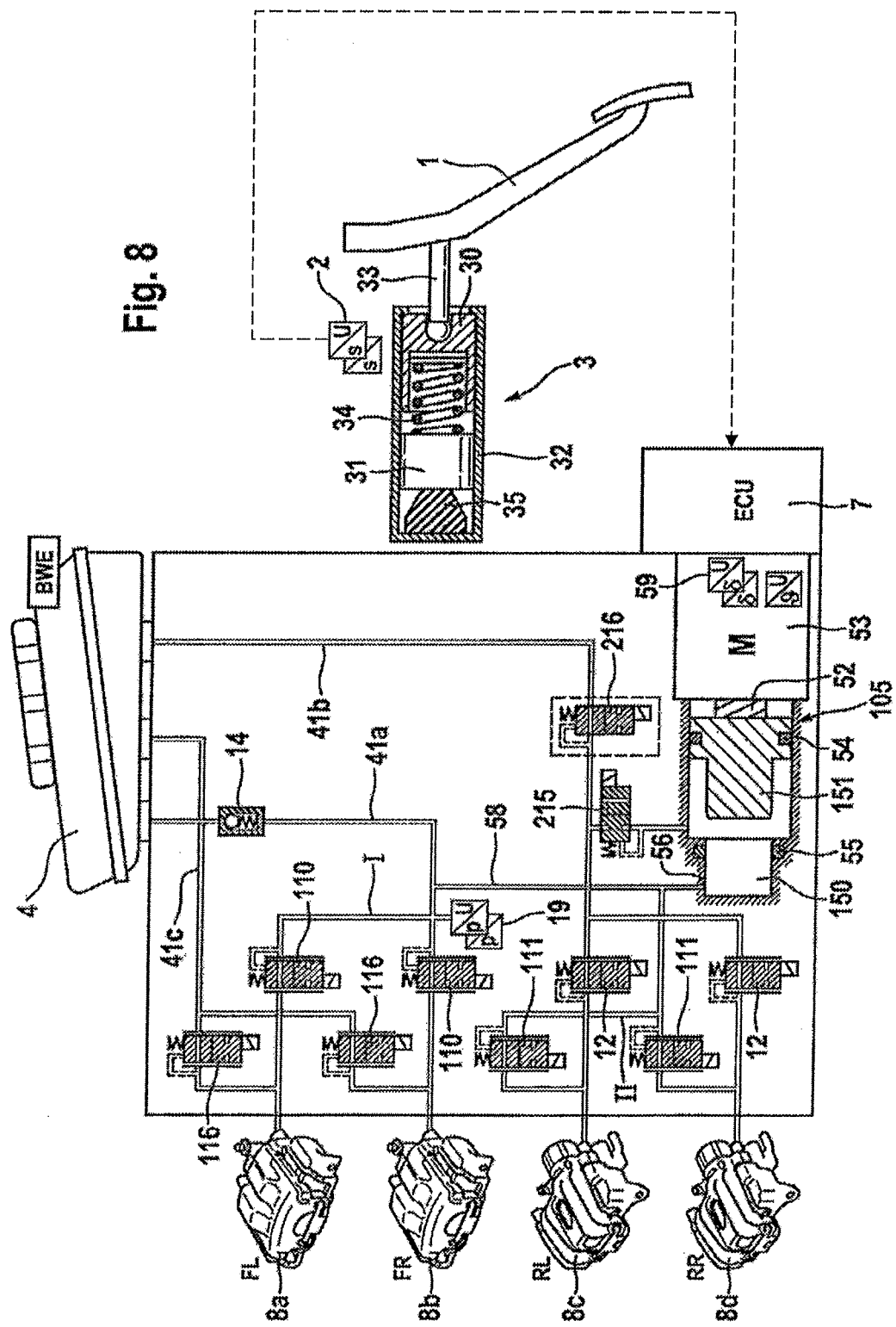
FIG. 8 shows schematically an eighth exemplary embodiment of a brake system according an aspect of to the invention.

FIG. 8 thus shows an eighth exemplary brake system with black and white division of the wheel brakes and analog actuated wheel valves 110, 116, 111, 12 as well as a pressure source 105 with a stepped piston 151 and a valve 215 according to the sixth exemplary embodiment I (FIG. 6). Optionally, and therefore shown with a dashed box in FIG. 8, a further electrically actuated, advantageously normally open valve 216 can be disposed in the return line 41b, which on being actuated enables hydraulic pressure equalization with the outlet valves open, and thus equal brake pressure can be achieved at the rear wheel brakes in the event of an inlet valve-controlled build-up of pressure at the rear wheels.

Figure 9:
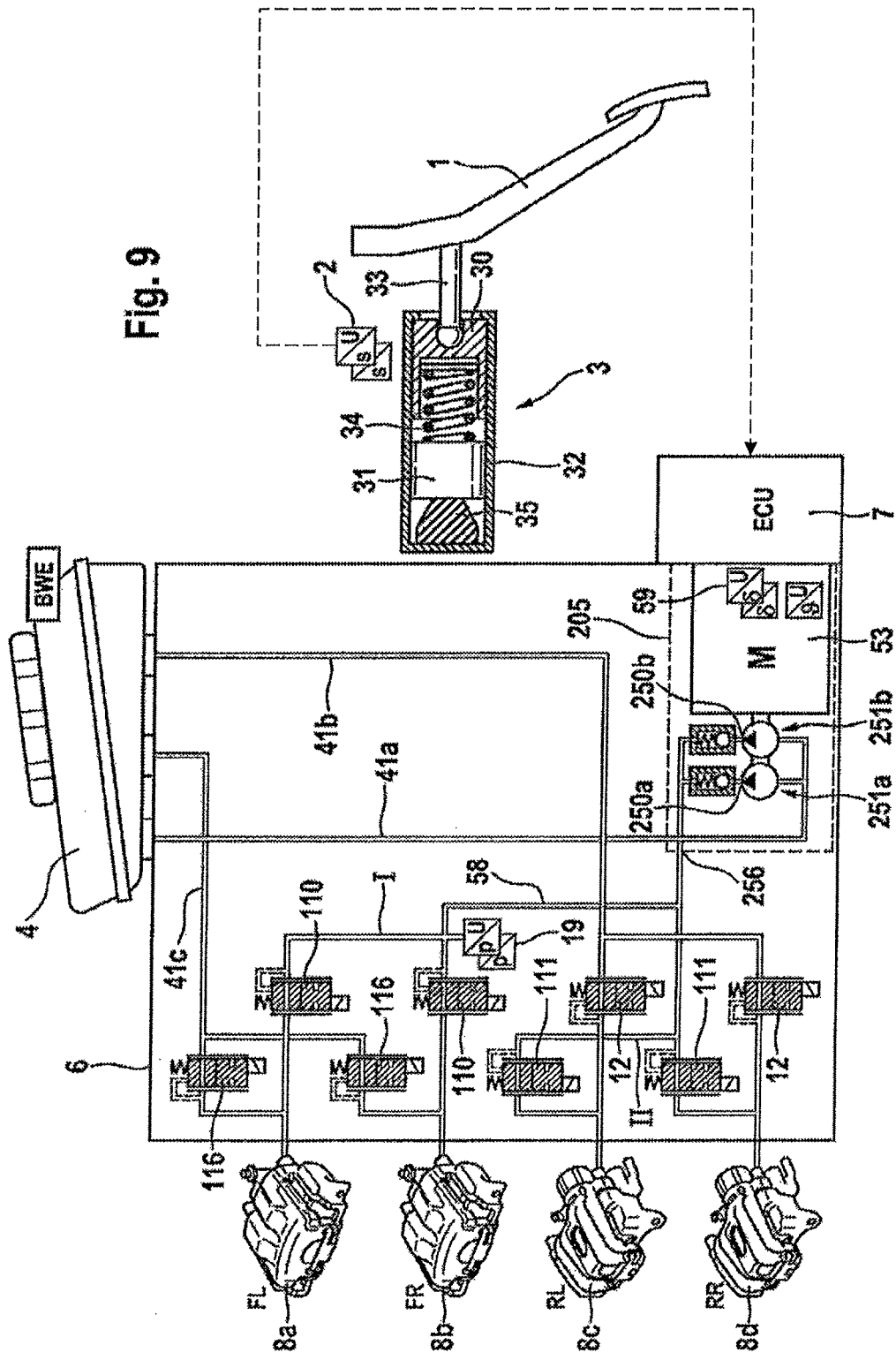
FIG. 9 shows schematically a ninth exemplary embodiment of a brake system according to an aspect of the invention.

A further exemplary embodiment of a pressure source 205 for the purposes of the invention is represented schematically in the ninth exemplary embodiment of a brake system according to the invention shown in FIG. 9. According to the example, the pressure source is formed by a displacement pump unit 205 for transporting a pressure medium, consisting of two piston-displacement pumps 251a, 251b and a common drive, wherein the drive comprises an electric motor 53. Each piston displacement pump 251a, 251b comprises a cylinder-piston arrangement that is not shown in detail in FIG. 9 with a pump piston and a sealing element. The pump piston is displaceably guided in a respective housing that is sealed by means of the sealing element. The pressure ports 250a, 250b of the cylinder-piston arrangements are connected together, so that the pressure source 205 comprises one (common) pressure port 256. The pressure port 256 is connected to the wheel brakes. The two brake circuits I, II are controlled in a fully analog manner. For this purpose, for each wheel brake 8a, 8b an electrically actuated, normally open, analogized or analog actuated inlet valve 110 is provided between the wheel brake 8a, 8b and the pressure source 205 as well as a normally open, analogized or analog actuated outlet valve 116. The outlet valves 116 are connected by means of the third pressure equalization line 41c to the pressure medium reservoir container 4. For each wheel brake 8c, 8d an electrically actuated, normally open, analogized or analog actuated inlet valve 111 is provided between the wheel brake 8c, 8d and the pressure source 205 as well as a normally open, analogized or analog actuated outlet valve 12, which is disposed between the wheel brake 8c, 8d and the pressure equalization line 41b. The suction ports of the piston displacement pumps 251a, 251b are connected to the pressure medium reservoir container 4 by means of the pressure equalization line 41a.

Besides the exemplary embodiments shown in FIGS. 1 through 9, other combination options of the various brake circuit distributions, wheel valve combinations and pressure sources are possible.

The brake system preferably comprises only one pressure sensor 19 for brake pressure adjustment.

As already described above by way of example, the brake system according to the invention preferably comprises an electrically actuated parking brake system with at least two electromechanically actuated brake actuators. Thus in the event of a mechanical fault of the pressure source, for example in the rotor of the electric motor or the rotation-translation transmission (for example a ball screw mechanism), the vehicle can always still be decelerated by means of the electrically actuated parking brake.

It is also preferable that the electronic control and regulation unit 7 for actuating the electric motor 53 is made in a redundant form such that the windings of the brushless motor are distributed and actuated so that the motor practically consists of two independent halves, with which in the event of a failure of one half the other still remains available. Thus even in the event of a single electrical fault in the actuation electronics or one of the windings, a pressure build-up by the pressure source continues to be possible. For example, in this case the common rotor drives the rotation-translation transmission, which displaces the hydraulic piston of the pressure source and hence takes care of the pressure build-up. With a robust design, the rotor and the rotation-translation transmission can be made practically mechanically fail-safe.

Thus in the event of an arbitrary single fault of the brake system, braking of the vehicle continues to be possible without the assistance of the driver being necessary for this. The brake system thus meets the desired safety requirements, inter alia those for autonomous driving.

Furthermore, the functional advantages represented by a single circuit pressure generating source remain, such as for example the very good controllability without a hysteresis effect of separating piston seals.

The brake system according to the invention also provides the advantage that the arrangement of the simulator actuating unit 1, 2, 3 can take place independently of the arrangement of the pressure modulation device 6. As a result, new degrees of freedom in vehicle packaging become available.

The invention claimed is:

1. A brake system for motor vehicles with a plurality of hydraulically actuated wheel brakes, the system comprising:
   a brake actuating element,
   a simulation device that works in conjunction with the brake actuating element with means for detecting a brake actuation by a driver of the vehicle, wherein the brake actuating element lacks any mechanical or hydraulic operative connection with any of the wheel brakes in any braking mode of the brake system,
   a pressure medium reservoir container at atmospheric pressure,
   an electrically controlled pressure source for actuation of the wheel brakes, which is or can be connected to each of the wheel brakes,
   electrically actuated wheel valves associated with the wheel brakes for adjusting wheel brake pressures, and
   at least one electronic control and regulation unit for actuating the pressure source and wheel valves,
   wherein the pressure source comprises at least one first piston that can be actuated by an electric motor and is displaceably guided in a housing, the housing defining a pressure chamber that is sealed by a first sealing element in a first position of the at least one first piston, wherein the pressure source comprises a second sealing element which is configured to seal the pressure chamber in a second position of the at least one first piston, the second sealing element implemented such that in the event of a leak in the first sealing element a pressure build-up at the wheel brakes is carried out by the pressure source using the second sealing element.

2. The brake system as claimed in claim 1, wherein the second sealing element has no sealing effect if the first piston is in a non-actuated state.

3. The brake system as claimed in claim 2, wherein the pressure source comprises a first cylinder-piston arrangement with the first piston and the first sealing element and a second cylinder-piston arrangement with a second piston and the second sealing element, wherein the first and the second piston can be actuated by the electric motor, and wherein the pressure ports of the cylinder-piston arrangements are connected to each other and are or can be connected to each of the wheel brakes.

4. The brake system as claimed in 2, wherein the pressure source comprises a pressure chamber bounded by the first piston and the housing, which pressure chamber is or can be connected to each of the wheel brakes, wherein the pressure chamber can be sealed by the first and/or the second sealing element.

5. The brake system as claimed in claim 1, wherein the pressure source comprises a pressure chamber bounded by the first piston and the housing, which pressure chamber is or can be connected to each of the wheel brakes, wherein the pressure chamber can be sealed by the first and/or the second sealing element.

6. The brake system as claimed in claim 5, wherein the pressure chamber is sealed by the first sealing element in a non-actuated state of the first piston and the second sealing element provides a seal following a predetermined actuation of the first piston.

7. The brake system as claimed in claim 5, wherein the pressure source comprises a stepped bore that is disposed in the housing and the first piston is in the form of a stepped piston, a smaller diameter piston stage of which, following a predetermined actuation of the stepped piston, divides the pressure chamber into a first pressure chamber that is sealed by the second sealing element and a second pressure chamber.

8. The brake system as claimed in claim 1, wherein the brake system comprises an electrically actuated parking brake system that comprises an electromechanically actuated brake actuator on each of at least two wheel brakes, wherein the parking brake system can be actuated by the control and regulation unit.

9. The brake system as claimed in claim 8, wherein the control and regulation unit comprises means with which braking is performed by means of the parking brake system in the event of a mechanical fault of the pressure source.

10. The brake system as claimed in claim 1, wherein the control and regulation unit are implemented such that a pressure build-up by the pressure source continues to be possible in the event of a single electrical fault in the pressure source.

11. The brake system as claimed in claim 1, wherein each of the wheel brakes is connected to the pressure medium reservoir container for the purposes of pressure equalization when the brake system is in a deenergized state.

12. The brake system as claimed in claim 1, wherein the pressure source comprises a first cylinder-piston arrangement with the first piston and the first sealing element and a second cylinder-piston arrangement with a second piston and the second sealing element, wherein the first and the second piston can be actuated by the electric motor, and wherein the pressure ports of the cylinder-piston arrangements are connected to each other and are or can be connected to each of the wheel brakes.

13. The brake system as claimed in claim 1, wherein the pressure source and the wheel valves, and the control and regulation unit, are disposed in a pressure modulation device that is spatially separate from the simulation device.

14. The brake system as claimed in claim 1, wherein means for actuating the electric motor, as well as the windings of the electric motor, are implemented such that a pressure build-up by the pressure source continues to be possible in the event of a single electrical fault in the pressure source.

\* \* \* \* \*